United States Patent
Garg et al.

(10) Patent No.: US 11,229,087 B2
(45) Date of Patent: *Jan. 18, 2022

(54) PARAMETER OPTIMIZATION AND EVENT PREDICTION BASED ON CELL HEURISTICS

(71) Applicant: Parallel Wireless, Inc., Nashua, NH (US)

(72) Inventors: Sumit Garg, Hudson, NH (US); Abhijit Navalekar, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,014

(22) Filed: Sep. 17, 2019

(65) Prior Publication Data

US 2020/0015318 A1    Jan. 9, 2020

Related U.S. Application Data

(63) Continuation of application No. 14/510,074, filed on Oct. 8, 2014, now Pat. No. 10,420,170.

(60) Provisional application No. 61/888,330, filed on Oct. 8, 2013.

(51) Int. Cl.
| | | |
|---|---|---|
| *H04W 84/18* | (2009.01) | |
| *H04W 4/02* | (2018.01) | |
| *H04W 24/02* | (2009.01) | |
| *H04W 36/00* | (2009.01) | |
| *H04W 4/029* | (2018.01) | |

(52) U.S. Cl.
CPC ............ *H04W 84/18* (2013.01); *H04W 4/023* (2013.01); *H04W 24/02* (2013.01); *H04W 36/0085* (2018.08); *H04W 36/00837* (2018.08); *H04W 4/029* (2018.02)

(58) Field of Classification Search
CPC .... H04W 4/028; H04W 16/00; H04W 6/0083
See application file for complete search history.

(56) References Cited

U.S. PATENT DOCUMENTS

| | | |
|---|---|---|
| 10,034,189 B2 | 7/2018 | Futaki et al. |
| 2004/0203459 A1 | 10/2004 | Borras-Chia et al. |
| 2012/0142351 A1 | 6/2012 | Takayanagi et al. |
| 2012/0269062 A1 | 10/2012 | Cho |
| 2013/0272274 A1 | 10/2013 | Ishida et al. |
| 2014/0226513 A1 | 8/2014 | Hapsari et al. |
| 2015/0009839 A1 | 1/2015 | Shikama |

(Continued)

*Primary Examiner* — Rhonda L Murphy
(74) *Attorney, Agent, or Firm* — Michael Y. Saji; David W. Rouille

(57) ABSTRACT

A heuristic approach to configuration and/or planning for wireless networks is disclosed herein. In one embodiment, statistics relating to mobile device cell usage are collected and monitored. The statistics may include UE measurements (RSRP/RSRQ), UE location, number of connection requests, duration of connectivity, average traffic load associated with the users, channel utilization, and other statistics. Based on statistical analysis of the data collected, neural network analysis, data fitting, or other analysis, adjustments to cell coverage parameters such as handover thresholds, inactivity timer values, contention window size, inter-frame duration, transmit power, DRX cycle duration, or other parameters may be identified.

11 Claims, 7 Drawing Sheets

(56) References Cited

U.S. PATENT DOCUMENTS

| | | |
|---|---|---|
| 2015/0056995 A1 | 2/2015 | Baillargeon |
| 2015/0207700 A1 | 7/2015 | Elmdahl et al. |
| 2015/0230147 A1* | 8/2015 | Brownworth ......... H04W 36/18 370/332 |
| 2015/0304907 A1* | 10/2015 | Centonza .......... H04W 36/0066 455/436 |

* cited by examiner

PARAMETER OPTIMIZATION AND EVENT PREDICTION BASED ON CELL HEURISTICS

CROSS-REFERENCE TO RELATED APPLICATIONS

This application is a continuation of, and claims the benefit of an earlier filing date under 35 U.S.C. § 120 to, U.S. patent applicaton Ser. No. 14/510,074, filed Oct. 8, 2014, and entitled "Parameter Optimization and Event Prediction Based on Cell Heuristics," which itself claims the benefit of priority under 35 U.S.C. § 119(e) of U.S. Provisional Patent Application No. 61/888,330, filed Oct. 8, 2013, and entitled "Parameter Optimization and Event Prediction Based on Cell Heuristics," each of which is hereby incorporated by reference in its entirety. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; and U.S. patent application Ser. No. 14/211,355, entitled "Methods of Incorporating an Ad Hoc Cellular Network into a Fixed Cellular Network," filed Feb. 18, 2014.

BACKGROUND

Recently, mobile phone networks have begun to take advantage of newer protocols and technologies developed on Internet Protocol (IP). The Long Term Evolution (LTE) protocol, which specifies both a core network architecture and an air interface for mobile devices, leverages an all-IP architecture to provide both data and voice. In the LTE architecture, wireless base stations, known as eNodeBs, provide access to mobile devices, known as user equipments (UEs), and utilize backhaul connections to a telecommunications operator's core network, which are typically wired connections.

Also, wide deployment of LTE/Wifi networks has resulted in an increased focus on efficient utilization of resources and bandwidth. Given the rise in data traffic and quality of service (QoS) expectations of end users, cell operators are placing a greater emphasis on cell capacity and coverage planning. Traditionally, the task of cell planning, also referred to as radio frequency (RF) planning, is carried out before the actual deployment and is based on a priori measurements. This results in the possibility of sub-optimal utilization of cell resources. Adjustments to cell parameters, e.g., transmit power or handoff thresholds, must be made "off-line," i.e., made in non-real time and requiring human intervention. Further, in the absence of feedback it is not possible to correctly predict or observe the impact of the changes made.

SUMMARY

A heuristic approach to configuration and/or planning for wireless networks is disclosed herein. In one embodiment, statistics relating to mobile device cell usage are collected and monitored. The statistics may include UE measurements (RSRP/RSRQ), UE location, number of connection requests, duration of connectivity, average traffic load associated with the users, channel utilization, and other statistics. Based on statistical analysis of the data collected, neural network analysis, data fitting, or other analysis, adjustments to cell coverage parameters such as handover thresholds, inactivity timer values, contention window size, inter-frame duration, transmit power, DRX cycle duration, or other parameters may be identified.

In one embodiment, a method is disclosed, including receiving, at a cloud coordination server, a mobile device handover request from a first tracking area to a second tracking area at a first location; receiving, at the cloud coordination server, a mobile device handover request from the second tracking area to the first tracking area; determining, based on the first location and a coverage area of a first base station covering the first tracking area, whether to perform a size adjustment of the first tracking area; and sending a message to the first base station to perform the size adjustment of the first tracking area.

The method may also include determining, based on the first location and a coverage of the first base station, and further based on a plurality of mobile device handover requests from the same mobile device, and further based on a predictive function for predicting the location of the mobile device based on past handover requests, whether to perform the size adjustment of the first tracking area.

DETAILED DESCRIPTION

The inventors have recognized and appreciated that it is possible to make predictions about the future location of a mobile device, and have also identified specific ways to use these predictions to enhance performance in a mobile wireless network.

Figure 1:
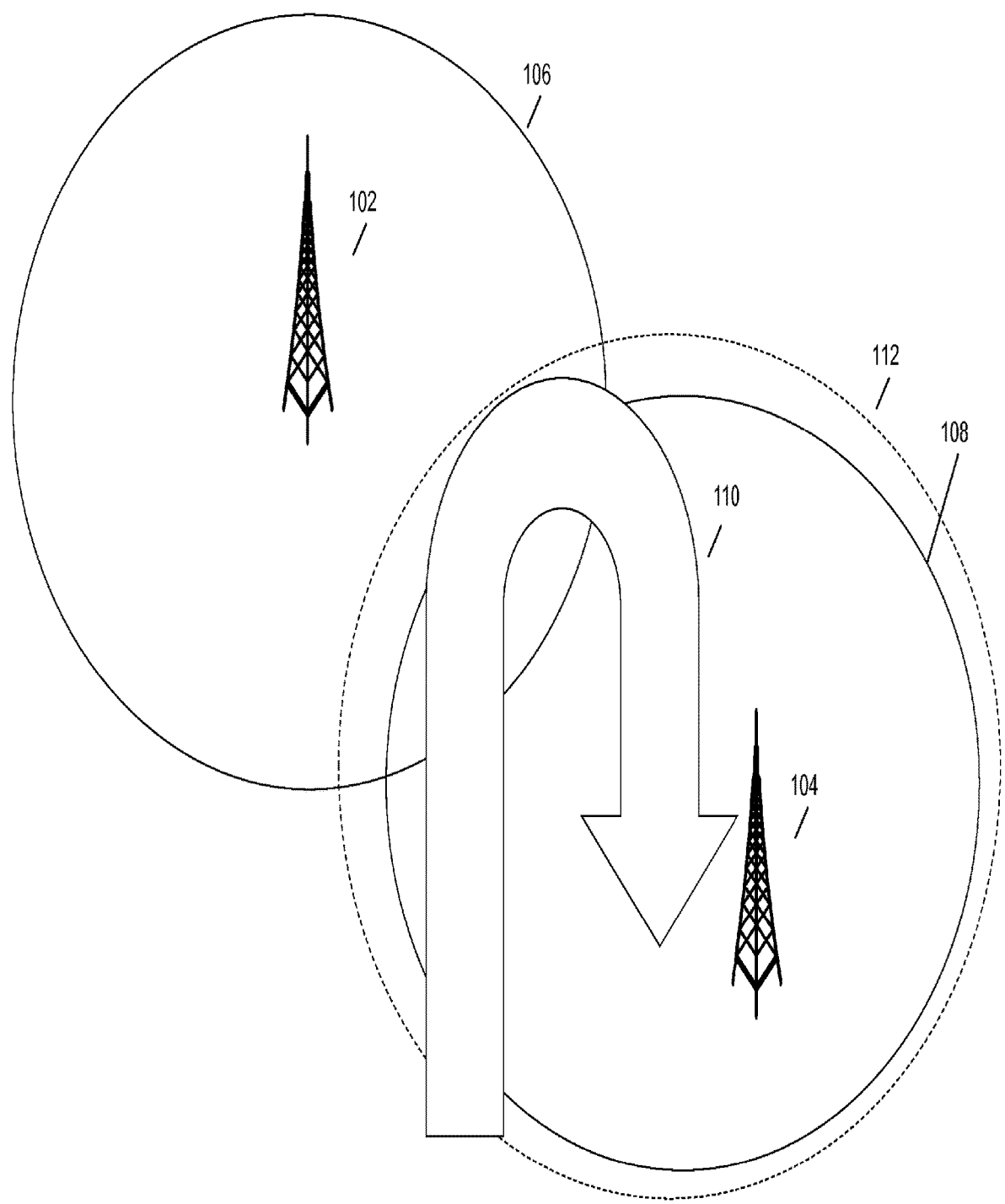
FIG. 1 is a schematic diagram of a network providing a handover, in accordance with some embodiments.

FIG. 1 is a schematic diagram of a network providing a handover, in accordance with some embodiments. A base station is located at cell tower 102, which provides wireless coverage within coverage area 106. A base station is also located at cell tower 104, which provides wireless coverage within coverage area 108. The base stations may be nodeBs, eNodeBs, or both, in some embodiments, and may be in communication with an operator core network and a cloud coordination server. Arrow 110 indicates the physical path taken by a mobile device, which may be a user equipment (UE), as it transits through the area between tower 102 and tower 104. Line 112 indicates a second potential coverage area for the base station located at cell tower 104.

The schematic diagram of FIG. 1 shows a network diagram and also shows a potential scenario to illustrate some embodiments. Recall that arrow 110 indicates the physical path taken by a mobile device. The mobile device may be located, for example, in a user's vehicle as he or she transits through the area at a relatively high speed. In a particular example scenario, the arrow may depict a portion of the user's commute to his or her workplace, specifically, the portion where the user exits the highway. The user may tend to go to work on weekdays, e.g., Monday through Friday. The user may tend to drive a motor vehicle at a certain speed, such as 60 miles per hour, up until the point at which he or she exits the highway, after which he or she may tend to drive the motor vehicle at a slower speed, such as 30 miles per hour. The user may tend to arrive at work at a similar time every day.

In some cases, although tracking area planning may be used to assess the placement of cell towers prior to their installation, cell tower placement may be sub-optimal, such as when a cell boundary falls on a high-traffic area. For example, in FIG. 1, cell tower 104 hosts a base station providing cellular coverage within coverage area 108. In the figure, a mobile device taking path 110 as shown will pass out of coverage area 108. This will necessitate a handover from the base station hosted at cell tower 104 to the base station hosted at cell tower 102. However, as the mobile device immediately passes back into coverage area 108, the handover to the base station hosted at cell tower 102 is immediately reversed, and the mobile device is handed back over to the base station hosted at cell tower 104. This brief double handover is sub-optimal, but may occur with some frequency. For example, if path 110 mirrors the location of a highway off-ramp, many mobile devices may take path 110 during the course of exiting the highway, especially if the highway off-ramp is in a heavily-trafficked area. This will result in unnecessary handovers, increased signaling traffic, and reduced network performance for both mobile device owners and the cellular station operator.

In some embodiments of the invention, information about a mobile device may be stored and associated with the specific mobile device over time. If a user's activities are regular, and/or if sufficient information is collected, it may become possible to use the collected information to make predictions about what various users will do in new situations, or at the present time, or at a future time. In other words, if the information about user activities is stored and analyzed, it may be possible to predict the trajectory of a mobile device when the mobile device enters a coverage area. For example, when the mobile device illustrated in FIG. 1 enters the coverage area of cell tower 104, it may be possible to predict that the owner of the mobile device is on his or her way to work.

Additional predictions may also be enabled, in some embodiments. For example, in addition to the traffic exit example described above, handovers that occur as a result of a predictable commute, predictable train route schedule, or other handovers may also be predicted. Handover activity and/or increased UE activity at a shopping center or mall after work hours or on the weekend may also be predicted. Reduction in range due to rain and/or other inclement weather may also be predicted. In some embodiments, other information, such as train schedules, weather reports, and traffic patterns may also be incorporated for performing predictions.

The predictions may be made, in some embodiments, at a base station, such as at the base station associated with cell tower 104, and may subsequently be transmitted to a central cloud coordination server (not shown). In other embodiments, the predictions may be made at a cloud coordination server, which may then communicate the information to one or more base stations. Making predictions may be based on various algorithms, may be performed in real time or offline, may involve performing searches and aggregating multiple records over a period of time or a moving time window, may involve performing analytics on the results of the searches, and may involve incorporating data from multiple sources, such as from multiple base stations. The prediction may take the form of a predicted path for the mobile device for some window of time in the future.

In some embodiments, predictions may be performed continuously. In other embodiments, predictions may be performed on an as-needed basis. For example, when a mobile device requests a handoff, a prediction could be made to assess the projected future location of the mobile device and the handoff request may be granted or denied based on the prediction. Triggering events, such as handoff requests, times of day, UE paging requests, or other system events may be used to initiate predictions. In some embodiments, predictions may take the form of a future position vector of the UE. In some embodiments, predictions may expressly cause particular subroutines or functions to be initiated, such as power adjustment functions. In some embodiments, multiple predictions may be averaged together to form a single prediction. In some embodiments, predictions may be constrained in conjunction with map data, so that, for example, predictions reflect the fact that mobile devices traveling at 60 miles per hour must be in a motor vehicle and therefore must be on a road.

Referring again to the example shown in FIG. 1, arrow 110 shows the physical path taken by a mobile device. Information could be collected about the position and velocity of the mobile device as it moves along the path shown by arrow 110. A prediction could subsequently be made identifying the projected future path of the mobile device at a subsequent time on the same arrow 110. In other words, a prediction system may take into account past trajectories to predict that a user will take the same trajectory on subsequent dates.

Once a prediction is made, the prediction may be used to enhance performance of the mobile network, in some embodiments. Referring again to FIG. 1, coverage area 108 is sized in such a way as to cause excessive handovers for mobile devices taking path 110. Expanding the coverage area of the base station at cell tower 104, from coverage area 108 to coverage area 112, eliminates the need for a double handover, as path 110 now passes entirely within the coverage area of the base station at cell tower 104. This enhancement may be enabled by increasing transmit power at the base station located at cell tower 104. In some embodiments, the increase in transmit power may be assessed and initiated by the base station at cell tower 104. In other embodiments, the increase may be performed in conjunction with a cloud coordination server. In some embodiments, a reduction in transmit power at the base station located at cell tower 102 may also be initiated, to avoid interfering with newly-expanded coverage area 112.

Figure 2:
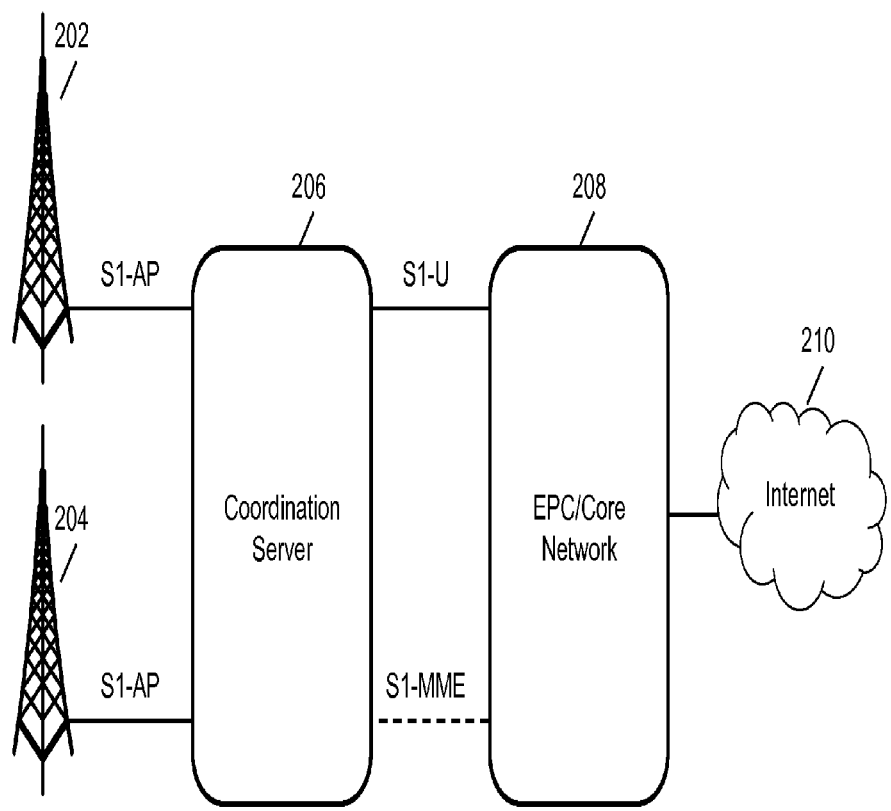
FIG. 2 is a schematic diagram of a network architecture for providing prediction capabilities, in accordance with some embodiments.

FIG. 2 is a schematic diagram of a network architecture for providing prediction capabilities, in accordance with some embodiments. Base stations 202 and 204 are connected via an S1-AP interface to coordination server 206. Base stations 202 and 204 may correspond to cell towers 102 and 104, in some embodiments. Base stations 202 and 204 are eNodeBs, in some embodiments. Coordination server 206 is connected to the evolved packet core (EPC)/Core Network 208 via an S1 protocol connection and an S1-MME protocol connection. Coordination of base stations 202 and 204 may be performed at the coordination server. In some embodiments, the coordination server may be located within the EPC/Core Network 208. EPC/Core Network 208 provides various LTE core network functions, such as authentication, data routing, charging, and other functions. In some embodiments, mobility management is performed both by coordination server 206 and within the EPC/Core Network 208. EPC/Core Network 208 provides, typically through a PGW functionality, a connection to the public Internet 210.

In some embodiments, for handling one or more coverage areas, each coverage area is divided into observation grids. The size of each grid may be uniform, can depend upon user entered parameters, and/or can be adjusted based on collected statistics. UE measurements, for LTE mobile devices, or mobile station (STA) statistics, for Wi-Fi mobile devices, are collected. The measurements may be collected periodically, as with UE measurement reports in LTE, or may be event-triggered, as with a UE admission time. The statistics collected may include UE data usage, a location of one or more UEs, a density map of one or more UEs (possibly prepared using the received location of one or more UEs), an average UE connection time, a UE mobility profile derived based on location, a handoff profile for the cell, an average time between consecutive connection attempts, a received signal strength indicator (RSSI), a reference signal received power (RSRP), a reference signal received quality (RSRQ), or other statistics. In some embodiments, global positioning system (GPS) location could also be collected from the UEs.

Based on the collected data, events may be predicted, and based on the predictions, adjustments may be made to parameters relating to cell coverage, in some embodiments. For example, based on the collected data, a prediction can be made about cell loading at a given time of day, allowing proactive load balancing prior to an overload event.

In some embodiments, a database containing the collected information may be used. The database may reside at the cloud coordination server, in some embodiments, or may reside at an eNodeB, or at more than one eNodeB, or at both the eNodeB and the cloud coordination server. The database may include one or more of: handover event records; number of handover events; typical data rates for a given eNodeB over multiple UEs, or for a single UE, or for a particular location; a typical number of users for a given eNodeB at a particular time; a record of a modulation and coding scheme (MCS) for one or more UEs for a given eNodeB at a given time; or other information pertaining to UEs. Information may be stored for several weeks, for one month, or for longer than one month, in some embodiments. The database may be enabled to store thousands of records, in some embodiments. The information may also be organized by grid, when an observation grid is used, instead of using a precise location, in some embodiments. Some eNodeB information may also be associated with the UE information at the time the UE information was collected, such as transmit power, handover thresholds, and other parameters that are subject to adjustment as described herein. By retaining and tracking eNodeB information, the effectiveness of the adjustment heuristics described herein may be improved and refined. Some or all of the information may be synchronized to a cloud server, in some embodiments.

Figure 3:
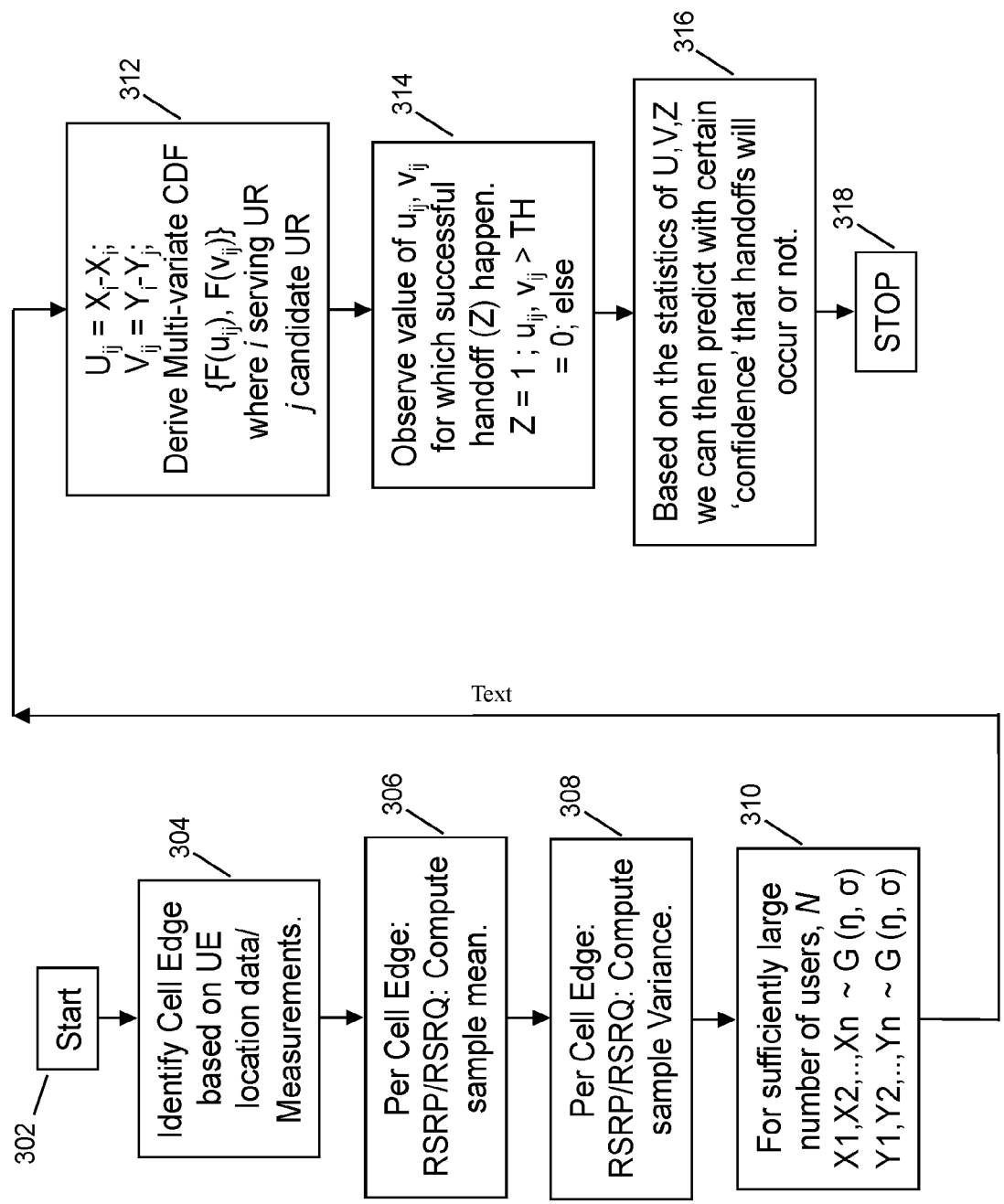
FIG. 3 is a flowchart depicting a method for collecting and analyzing data using a statistical analysis method, in some embodiments.

In some embodiments, the collected data may be analyzed using a statistical analysis method, as shown in FIG. 3. By using multi-variate statistical techniques, we can characterize the data in terms of statistical parameters like mean, variance and skewness.

FIG. 3 is an exemplary method that may be executed at a coordination server 206, at an individual base station or eNodeB, or at another network node. The methods shown in FIG. 3 and described elsewhere herein may be performed weekly, in some embodiments, or when sufficient data has been collected or is stored in the collected information database.

At step 302, operation starts. At step 304, the cell boundary is identified. The cell boundary corresponds to coverage area 108 in FIG. 1. In the field, cell boundaries vary based on topography and other factors. One way to identify the boundary of a cell is by examining user equipment (UE) measurement reports. Measurement reports are sent by a UE to its base station periodically, according to the LTE standard, and include measurements of signal strength and signal quality. These measurements may include received signal strength indication (RSSI), reference signal received power (RSRP), reference signal received quality (RSRQ), or other parameters, in some embodiments. Each user equipment may send out measurement reports, which may be aggregated, in some embodiments. The measurements may be communicated to a mobility management entity (MME) (not shown), in some embodiments. The measurements may be communicated to coordination server 206, in some embodiments.

Accordingly, in some embodiments, step 304 may involve identifying that the reference measurement has fallen below a given threshold with reference to the signal measurements described above. Once the reference measurement has fallen below the threshold, the UE can be deduced to be at the cell boundary, and operation may be passed to step 306.

At steps 306 and 308, once the cell edge or cell boundary is identified, aggregation of RSRP/RSRQ measurements is performed. Specifically, at step 306, a sample mean is computed over the aggregated measurements, and at step 308, a sample variance is computed over the aggregated measurements. In one embodiment, the measurements are aggregated over a plurality of UEs. In other embodiments, measurements are aggregated over time (with a window of days or weeks, a sliding window, or another window). In other embodiments, aggregation over other parameters, or over multiple parameters (i.e., both time and UE), is performed. A standard statistical function of mean and variance may be used, in some embodiments. In some embodiments, a median may be used in place of a mean.

At step 310, once data has been collected for a sufficiently large number of users N, the measurements $X_1, X_2, \ldots, X_n$ are fitted to a probability distribution $G(\eta,\sigma)$, where $\eta$ is the mean or median and $\sigma$ is the variance. Similarly, measurements $Y_1, Y_2, \ldots, Y_n$ are fitted to the same probability function $G(\eta, \sigma)$. X and Y may be measurements from different UEs, in some embodiments, such that measurements $X_1, X_2, \ldots, X_n$ are measurements over time for UE X.

At step 312, cumulative distribution functions U and V are calculated, where $U_{ij}=X_i-X_j$, and $V_{ij}=Y_i-Y_j$, in some embodiments. U and V are cumulative distribution functions that indicate whether, for a given i and j, a handover was attempted from a serving eNodeB i to a candidate eNodeB j between measurements $X_i-X_j$ or $Y_i-Y_j$ for any i and j. U and V will thus indicate whether a handover occurred during a particular interval between eNodeB i and eNodeB j. Additionally, a new multi-variate cumulative distribution function $\{F(u_{ij}), F(v_{ij})\}$ is calculated to determine whether the same handover occurs across different UEs.

At step 314, the values of $u_{ij}$ and $v_{ij}$ are observed, for which successful handoffs happen. These successful handoffs are notated Z, and a threshold TH is calculated such that $u_{ij}$, $v_{ij}$>TH=0. At step 316, based on the statistics U, V, and Z, a probability may be calculated with a given confidence whether a handoff will occur between eNodeBs i, j for a given UE X or Y. At step 318, execution stops.

Figure 4:
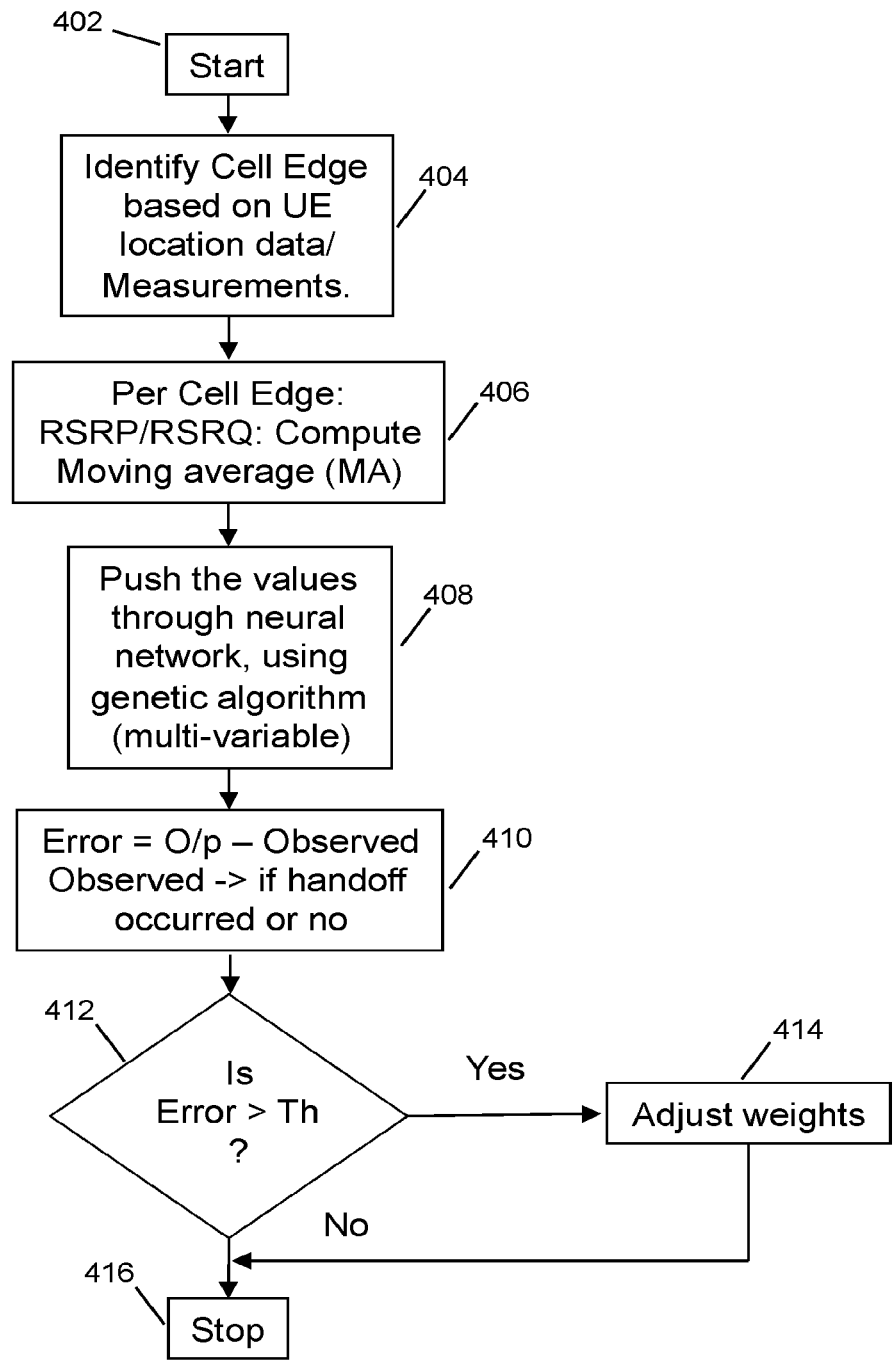
FIG. 4 is a flowchart depicting a method for collecting and analyzing data using a hybrid statistical-neural networks method, in some embodiments.

In some embodiments, the collected data may be analyzed using a hybrid statistical-neural networks method, as shown in FIG. 4. At step 402, execution starts. At step 404, the cell edge is identified, which may be according to the method described above with reference to step 304. At step 406, a moving average of RSRP and/or RSRQ is computed per cell edge.

At step 408, the moving average values output from step 406 are input to a neural network. The neural network may be a computational model capable of machine learning and pattern recognition. In some embodiments, the neural network may use parallel distributed processing. In some embodiments, the neural network may use a genetic algorithm and may execute several algorithms in parallel. In some embodiments, the neural network may use a multi-variable approach.

At step 410, the output of the neural network may be analyzed. The error may be described by the function Error=O/p−Observed, where the value of Observed is based on whether a handoff actually was observed in the field by the UE or the eNodeB, or by another node. Any appropriate measure of neural network error may be used.

Once the error has been estimated, at step 412, if the neural network error exceeds a threshold, the threshold being determined experimentally, one or more operational parameters may be adjusted at step 414. These parameters include the likelihood that an eNodeB will perform a redirection to preemptively suggest a handover, as well as a transmit power for one or the other of the nodes in question, in some embodiments. At step 416, operation terminates.

Figure 5:
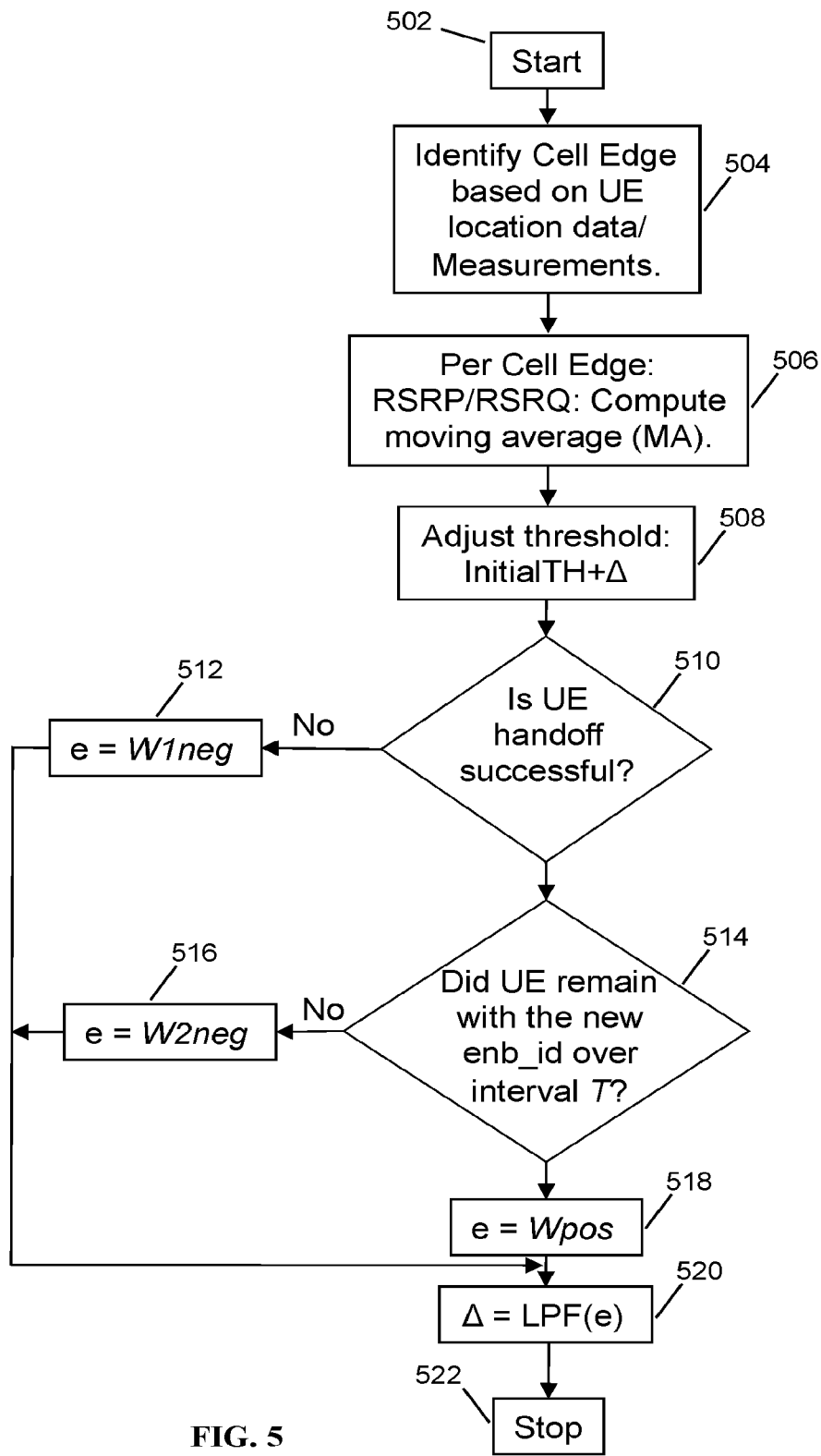
FIG. 5 is a flowchart depicting a method for handoff threshold optimization between two adjacent nodes, in some embodiments.

In some embodiments, handoff threshold optimization between two adjacent nodes may be performed, as shown in FIG. 5. In the depicted embodiment, a handoff is triggered between two eNodeBs in an LTE network when a measurement passes below a threshold. Statistical data may be used to compute the probability of the UE being handed off to the adjacent cell, as described earlier with reference to FIG. 3. If the probability exceeds a certain threshold, the UE may be sent a redirect message before it loses connectivity, to pre-emptively cause the handoff to occur without a loss of connectivity or degradation of service.

Turning to FIG. 5, a method is depicted for evaluating a particular UE handover. At step 502, operation starts. At step 504, the cell edge is identified, which may be according to the method described above with reference to step 304, above. At step 506, a moving average of RSRP and/or RSRQ is computed per cell edge, as with step 406, above.

At step 508, an initial threshold InitialTH is adjusted with a parameter Δ. The parameter Δ may be changed in later steps. At step 510, a branch point checks whether the UE handoff has been successful. If the handoff has failed, processing proceeds to step 512, wherein an error adjustment parameter e is set to a value W1neg, and from step 512 to step 520.

If the handoff has succeeded, processing proceeds to step 514. At this step, processing pauses for an interval T After the interval T has elapsed, a check is performed to determine whether, subsequent to the handoff, the UE remained with the new eNodeB for the duration of the interval T. In the case that the UE has not remained with the new eNodeB for the duration T, processing proceeds to step 516, wherein the error adjustment parameter e is set to a value W2neg, and from step 516 to step 520.

If the UE has remained over the interval T, step continues to step 518, wherein the error adjustment parameter e is set to a value Wpos. Processing proceeds to step 520.

At step 520, the value of parameter e is dependent on one of preceding steps 512, 516, and 518. Depending on the parameter, the predictive threshold adjustment parameter Δ is adjusted with a negative value, if the handover was ultimately unsuccessful as per steps 512 and 516, or a positive value, if the handover was successful as per step 518. In some embodiments, a low pass filter (LPF) may be used to smooth the final value of A. At step 522, processing stops.

Figure 6:
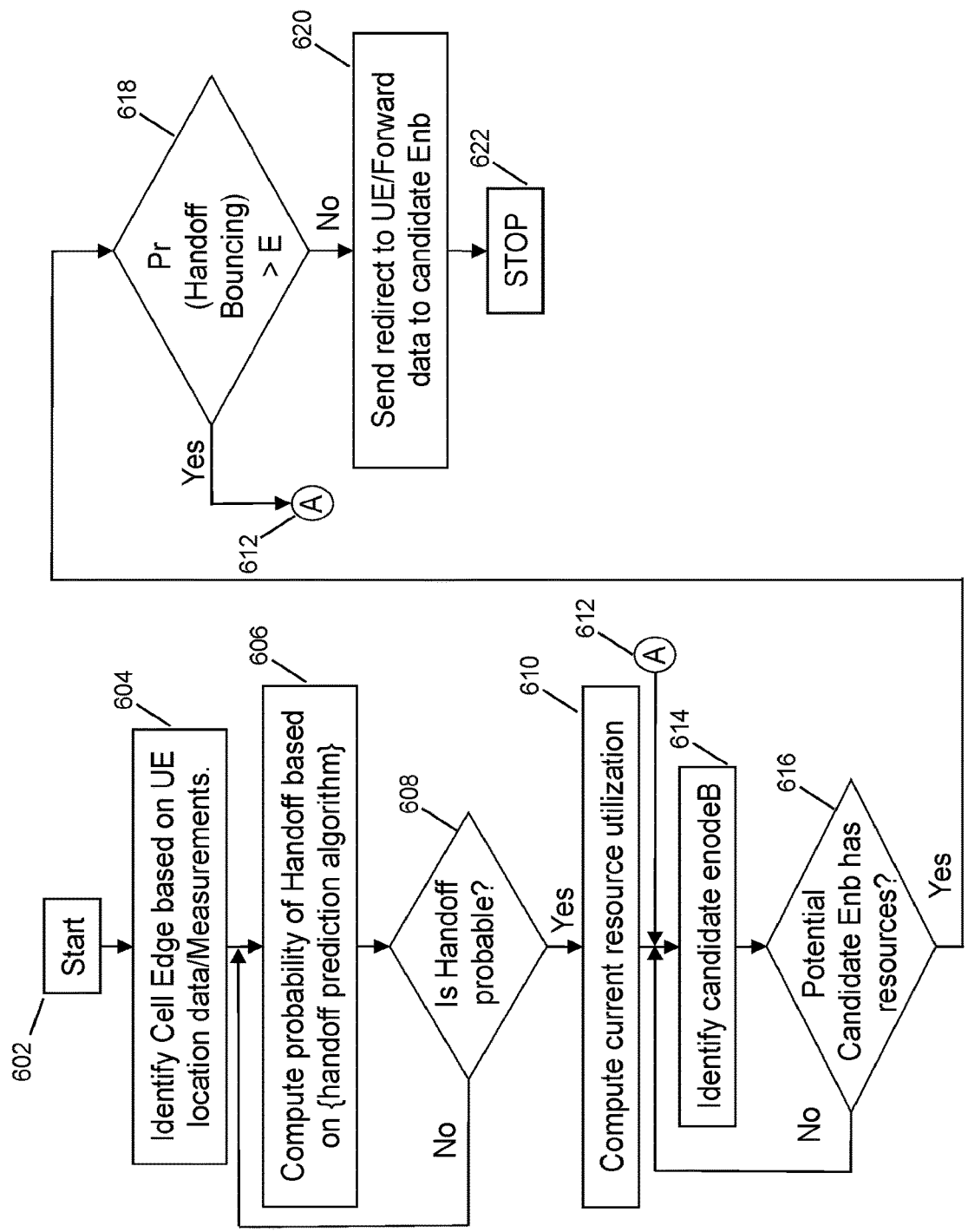
FIG. 6 is a flowchart depicting a method for avoiding handoff 'bounces' between adjacent cells, in some embodiments.

In some embodiments, handoff 'bounces' may be avoided between adjacent cells, as shown in FIG. 6. Handoff 'bounces' are scenarios in which a UE is handed over from a first cell to a second cell, and then immediately handed back over. This scenario is described above with reference to the diagram in FIG. 1. Whether a handoff is a bounce may be dependent on the amount of time spent attached to the second cell; when the time spent attached to the second cell is less than ten minutes, in some embodiments, or less than one minute, in other embodiments, the handoff may be considered a bounce handoff. The time spent may be adjusted to improve the performance of the tracking algorithm.

At step 602, processing starts. At step 604, the cell edge is identified, which may be according to the method described above with reference to step 304, above. At step 606, a probability of handoff may be calculated based on a handoff prediction algorithm, such as the algorithm disclosed above with reference to FIGS. 3 and/or 4.

At step 608, the probability of handoff is used to assess whether handoff is probable. If handoff is not probable, processing may loop back to step 606, and the loop may continue until a handover is determined to be probable, at which point processing continues to step 610.

At step 610, current resource utilization is computed. At step 614, a candidate eNodeB is identified. At step 616, the candidate eNodeB is evaluated for whether the candidate eNodeB has the needed resources. If resources are not available, processing returns to step 614 until another eNodeB is found or until resources become available at the identified candidate eNodeB. If resources are available, processing continues to step 618.

At step 618, the probability that the handoff is a "bounce" is evaluated. If the probability exceeds a threshold ε, processing returns to step 612, which returns operation to step 614 and causes a new candidate eNodeB to be selected. If the probability does not exceed the threshold ε, processing continues to step 620, which causes the UE to complete the handover. At step 622, processing stops.

Figure 7:
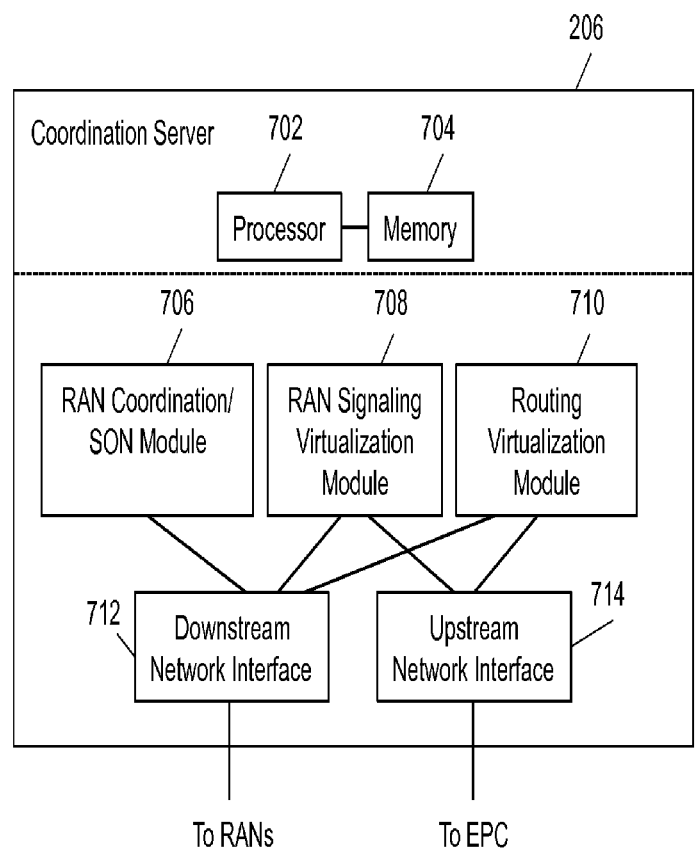
FIG. 7 is a block diagram of an exemplary device for performing a prediction method, in accordance with some embodiments.

FIG. 7 is a block diagram of an exemplary device for performing a power adjustment method, in accordance with some embodiments. The cloud coordination server 206 described in FIG. 2 is shown in greater detail. Coordination server 206 includes processor 702 and memory 704, which are configured to provide the functions described herein. Also present are radio access network coordination/self-organized network (RAN Coordination and SON) module 706, RAN signaling virtualization module 708, and routing virtualization module 710. In some embodiments, coordination server 206 may coordinate multiple RANs using coordination module 706. In some embodiments, coordination server may also provide routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Alternatives

The inventors have appreciated and recognized that the methods used herein for handover optimization between LTE cells could be utilized for any broadband network, and the description herein is presented without loss of generality.

Various alternative embodiments are also contemplated by the inventors. For example, certain functions may be performed at an eNodeB, or at a multi-radio access technology node (multi-RAT) node, instead of at a cloud coordination server. The cloud coordination server may be known as a LTE access controller. The functions of the cloud coordination server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer base stations, for more or fewer predictions, more or fewer mobile devices, and other alternatives. In some embodiments, the heuristics may be performed at the eNodeB, at the cloud coordination server, within a function performing coverage and power adjustment, or at another location. In some embodiments, a cloud coordination server may identify and initiate the process described herein in conjunction with other power adjustments to improve channel quality.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to Wi-Fi networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method comprising:
    receiving, at a cloud coordination server, a mobile device handover request for a mobile device from a first coverage area to a second coverage area at a first location;
    receiving, at the cloud coordination server, a mobile device handover request for a mobile device from a second coverage area to the first coverage area;
    computing a moving average value of at least one of RSRP and RSRQ per cell edge of the second coverage area and the first coverage area;
    pushing the moving average values to a neural network;
    generating a prediction, based on analysis of an output of the neural network, corresponding to whether a future handover will occur for the mobile device from the second coverage area to the first coverage area;
    determining, based on the prediction and the first coverage area, whether to perform a size adjustment of the first coverage area by increasing a transmit power level of a first base station covering the first coverage area; and
    sending, subsequent to the determining, a message from the cloud coordination server to the first base station to perform the size adjustment of the first coverage area, thereby reducing future handovers from the first coverage area to the second coverage area and back to the first coverage area.

2. The method of claim 1, further comprising determining, based on the first location and a coverage of the first base station, and further based on a plurality of mobile device handover requests from the same mobile device, and further based on a predictive function for predicting location of the mobile device based on past handover requests, whether to perform the size adjustment of the first coverage area.

3. The method of claim 2, wherein the predictive function is based on a probabilistic model of handover occurrence based on handover information of a plurality of mobile devices.

4. The method of claim 2, further comprising storing one or more of: user equipment (UE) measurement reports, mobile station statistics, UE data usage, a location of one or more UEs, a density map of one or more UEs, an average UE connection time, a UE mobility profile derived based on location, a handoff profile for a cell, an average time between consecutive connection attempts, a received signal strength indicator (RSSI), a reference signal received power (RSRP), a reference signal received quality (RSRQ), and a global positioning system (GPS) location.

5. The method of claim 2, further comprising:
    computing a sample mean per cell edge;

computing a sample variance per cell edge;
deriving a handoff predictive model from the sample mean per cell edge and the sample variance per cell edge; and
using the derived handoff predictive model, determining whether to perform the size adjustment of the first coverage area.

6. The method of claim 1, further comprising receiving, from the mobile device, at the cloud coordination server, a signal strength measurement, and storing the signal strength measurement at the cloud coordination server.

7. The method of claim 1, wherein the mobile device is a user equipment (UE) and the first base station is an eNodeB.

8. A coordinating node, comprising:
a processor;
a first network interface coupled to the processor and in communication with a radio access network base station in a cellular telecommunications network;
a second network interface coupled with the processor and in communication with a core network of the cellular telecommunications network; and
a storage medium coupled to the processor, the storage medium configured to store records, the records comprising location data of a mobile device, a timestamp, a signal strength indicator of an associated serving base station of the mobile device that is the radio access network base station, and an associated coverage area of the serving base station;
wherein the processor is configured to perform steps comprising:
retrieving a plurality of records from the storage medium, the plurality of records pertaining to at least two mobile devices and pertaining to at least two coverage areas, the at least two coverage areas divided into a plurality of observation grids, wherein a size of the observation grid is adjusted based on collected statistics;
generating a prediction, based on the retrieved plurality of records, of whether a future handover will occur for the mobile device from a second coverage area to a first coverage area, wherein the mobile device is a user equipment (UE);
determining whether to perform a size adjustment of the first coverage area;
sending, subsequent to the determining, a message from the coordinating node to the serving base station to perform the size adjustment of the first coverage area;
generating a cumulative distribution function U based on measurements from a first user equipment (UE) and generating a cumulative distribution function V based on measurements from a second UE, wherein U and V are cumulative distribution functions that indicate whether, for a given first base station and a given second base station and a given time interval, a handoff was attempted between the given first base station and the given second base station.

9. A method, comprising:
storing, at a gateway situated in a communication path between a plurality of base stations and a cellular operator core network, for a plurality of mobile devices, and for a plurality of past times, and for the plurality of base stations, a signal strength as received by at least one of the plurality of mobile devices;
dividing a coverage area into a plurality of observation grids, wherein a size of the observation grid is adjusted based on collected statistics and storing, at the gateway and with the signal strength, an observation grid location;
calculating, based on the stored signal strength, a probability of a first handover of a presently active mobile device from a first coverage area to a second coverage area;
calculating, based on the stored signal strength and the probability of handover, a probability of a future handover of the presently active mobile device from the second coverage area to the first coverage area, wherein the mobile devices are user equipments (UEs);
sending, based on the calculated probability of the first handover and the calculated probability of the future handover, a message from the gateway to the base station to perform a size adjustment of the first coverage area;
generating a cumulative distribution function U based on measurements from a first user equipment (UE) and generating a cumulative distribution function V based on measurements from a second UE, wherein U and V are cumulative distribution functions that indicate whether, for a given first base station and a given second base station and a given time interval, a handoff was attempted between the given first base station and the given second base station.

10. The method of claim 9, further comprising using a multi-variate probability function.

11. The method of claim 9, further comprising adjusting a threshold for performing handovers based on the calculated probability of handover and the calculated probability of the future handover.

* * * * *